United States Patent
Arita et al.

(10) Patent No.: US 9,470,543 B2
(45) Date of Patent: Oct. 18, 2016

(54) NAVIGATION APPARATUS

(75) Inventors: Hidekazu Arita, Tokyo (JP); Mitsuo Shimotani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/414,186

(22) PCT Filed: Aug. 30, 2012

(86) PCT No.: PCT/JP2012/071957
§ 371 (c)(1),
(2), (4) Date: Jan. 12, 2015

(87) PCT Pub. No.: WO2014/033869
PCT Pub. Date: Mar. 6, 2014

(65) Prior Publication Data
US 2015/0211880 A1  Jul. 30, 2015

(51) Int. Cl.
*G01C 21/00* (2006.01)
*G01C 21/36* (2006.01)
*G09B 29/10* (2006.01)

(52) U.S. Cl.
CPC ......... *G01C 21/3667* (2013.01); *G01C 21/367* (2013.01); *G09B 29/106* (2013.01); *G06F 2203/04803* (2013.01)

(58) Field of Classification Search
USPC ....................................................... 701/409
See application file for complete search history.

(56) References Cited

U.S. PATENT DOCUMENTS

| | | | |
|---|---|---|---|
| 7,058,507 B2 | 6/2006 | Saiki | |
| 8,332,142 B2 | 12/2012 | Tanaka | |
| 8,442,761 B2 * | 5/2013 | Nezu | G01C 21/367 |
| | | | 701/433 |
| 2004/0148090 A1 * | 7/2004 | Melen | G01C 21/26 |
| | | | 701/482 |
| 2008/0051990 A1 | 2/2008 | Nomura et al. | |
| 2008/0154499 A1 * | 6/2008 | Tanaka | G01C 21/362 |
| | | | 701/431 |

FOREIGN PATENT DOCUMENTS

| | | |
|---|---|---|
| CN | 1918454 A | 2/2007 |
| CN | 101720054 A | 6/2010 |
| CN | 102278992 A | 12/2011 |
| JP | 2003-106852 A | 4/2003 |
| JP | 2003-130655 A | 5/2003 |
| JP | 3879615 B2 | 2/2004 |
| JP | 2005-241560 A | 9/2005 |
| JP | 2007-57365 A | 3/2007 |
| JP | 2008-224520 A | 9/2008 |
| JP | 2009-204457 A | 9/2009 |
| JP | 2010-271272 A | 12/2010 |
| JP | 2011-220849 A | 11/2011 |

* cited by examiner

*Primary Examiner* — Hussein A. Elchanti
(74) *Attorney, Agent, or Firm* — Birch, Stewart, Kolasch & Birch, LLP (57) ABSTRACT

A navigation apparatus that acquires position information regarding a specific information device enables its own position relative to the specific information device to be easily grasped. The navigation apparatus includes a communication unit that communicates with the specific information device, an own position calculator that calculates its own position, an other person's position acquiring unit that acquires the position of the specific information device via the communication unit, an other person's moving direction acquiring unit that obtains a moving direction of the specific information device, and a display/input unit configured to display a map. The display/input unit displays a map with the moving direction of the specific information device oriented up.

18 Claims, 12 Drawing Sheets

NAVIGATION APPARATUS

TECHNICAL FIELD

The present invention relates to a navigation apparatus, and in particular to a navigation apparatus that has a function of acquiring position information regarding a specific information Device.

BACKGROUND ART

Patent Document 1 below, for example, discloses a navigation apparatus that transmits its own position information to a specific information device. The navigation apparatus of Patent Document 1 has a function of, when the vehicle has arrived in the vicinity of a meeting point (meeting place) where the driver has arranged to meet a person who is on foot but cannot reach the meeting point due to the traffic situation or some such reason, transmitting the position of the vehicle as a new meeting point to a mobile information communication terminal (hereinafter, referred to as a "mobile terminal") of the person on foot whom the driver is meeting.

PRIOR ART DOCUMENT

Patent Document

Patent Document 1: Japanese Patent Application Laid-Open No. 2009-204457

SUMMARY OF INVENTION

Problems to be Solved by the Invention

If the mobile terminal of the person whom the driver is meeting is a portable navigation apparatus, the navigation apparatus of the vehicle is capable of notifying the person of the vehicle's position by transmitting its position information to the portable navigation apparatus. The meeting up of the vehicle and the person is achieved by the person moving to the vehicle's position under the guidance of the portable navigation apparatus.

However, if the driver of the vehicle wants to park in the vicinity of the meeting point and notify the person whom he or she is meeting of the vehicle's position, the driver needs to contact the person by a mobile phone or the like and explain the vehicle's position to the person. In this case, it would be easy for the person whom the driver is meeting to comprehend the vehicle's position if the driver of the vehicle explains the relative position of the vehicle from the perspective of the person. However, the navigation apparatus ordinarily displays a map based on its own position and moving direction, and therefore it is difficult for the driver of the vehicle to intuitively grasp the vehicle's position from the perspective of the person even when looking at the display of the vehicle's navigation apparatus.

The present invention has been made in order to solve such problems, and it is an object of the present invention to enable a navigation apparatus that acquires position information regarding a specific information device to easily grasp its own position relative to the position of the specific information device.

Means for Solving Problems

A navigation apparatus according to the present invention includes a communication unit that communicates with a specific information device, an own position calculator that acquires an own position, an other person's position acquiring unit that acquires a position of the specific information device via the communication unit, an other person's moving direction acquiring unit that obtains a moving direction of the specific information device, and a display unit configured to display a map. The display unit displays a map with the moving direction of the specific information device oriented up.

Advantageous Effects of the Invention

The navigation apparatus according to the present invention displays a map with the moving direction of the specific information device oriented up, thus enabling the user to intuitively grasp his or her own position relative to the position of the specific information device. This makes it easy for the user to notify the user of the specific information device of his or her own position, thus facilitating the process of meeting up.

These and other objects, features, aspects and advantages of the present invention will become more apparent from the following detailed description of the present invention when taken in conjunction with the accompanying drawings.

DESCRIPTION OF EMBODIMENTS

Embodiment 1

Figure 1:
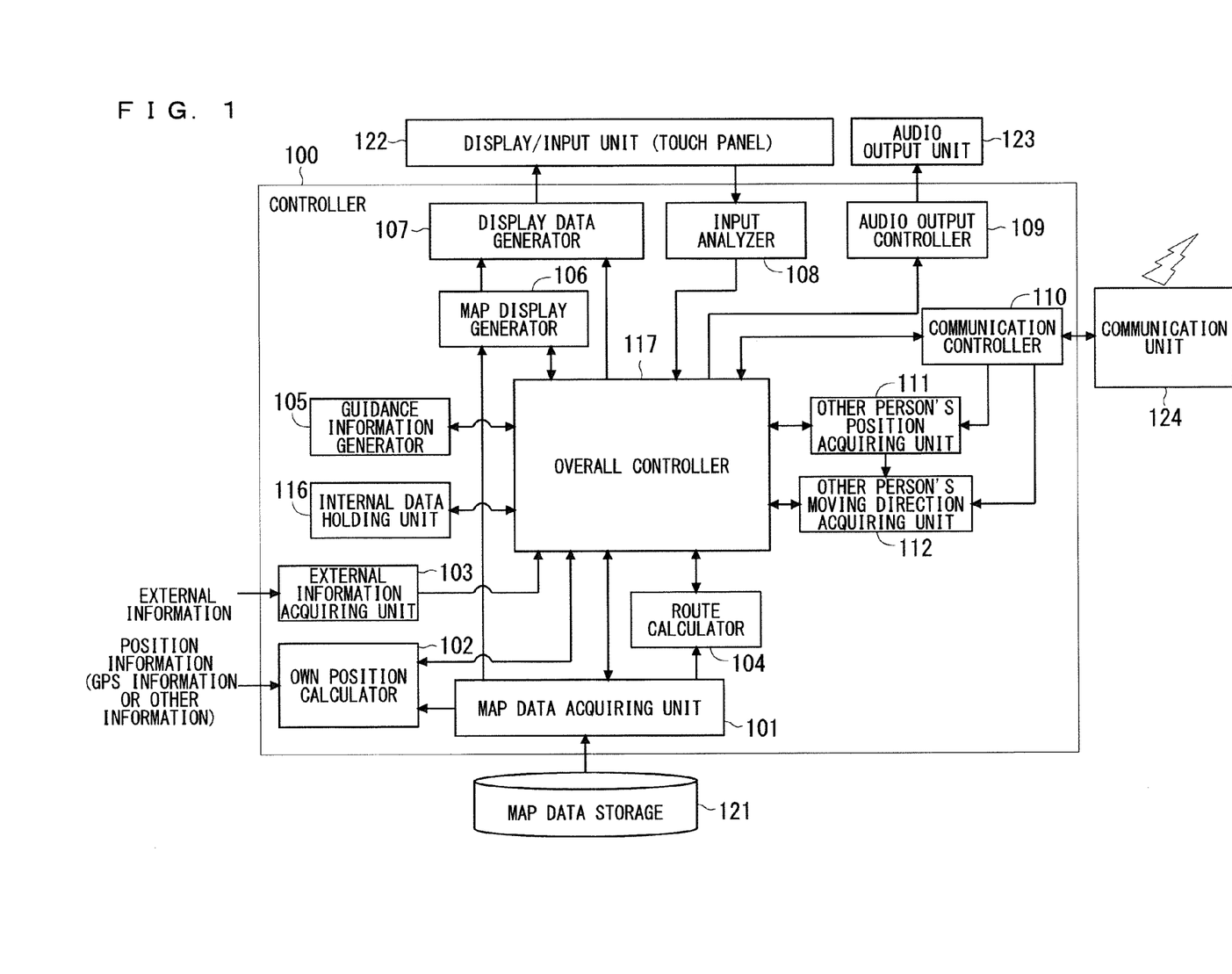
FIG. 1 is a block diagram illustrating a configuration of a navigation apparatus according to Embodiment 1.

FIG. 1 is a block diagram illustrating a configuration of a navigation apparatus according to Embodiment 1. The navigation apparatus has a function of acquiring the current position of a specific information device (e.g., a mobile terminal or another navigation apparatus) through communication and displaying that current position on a map.

The navigation apparatus according to Embodiment 1 includes a map data storage 121, a display/input unit 122, an audio output unit 123, a communication unit 124, and a controller 100 that controls these units.

The map data storage 121 is, for example, a storage medium such as a hard disk or a memory card and stores map data (map information) for use in the navigation apparatus. The display/input unit 122 is, for example, a touch panel (a display panel having a touch-sensitive function) and has a function serving as a display unit that provides information to a user and a function serving as an input unit that receives input of user operations.

Display on the display/input unit 122 includes maps, icons that indicate points such as the current position and the destination, a line that indicates the route from the current position to the destination, and software keys for a user to operate on the display/input unit 122. It is also possible to provide a display unit and an input unit separately, instead of providing the display/input unit 122.

The audio output unit 123 is a speaker, for example, and has a function of outputting audio for voice route guidance, provision of traffic information, and operation guidance and the like.

The communication unit 124 has a function of communicating with a specific information device (hereinafter, referred to as a "specific device") such as a mobile terminal of a person whom the user of the navigation apparatus is meeting, for example. The communication unit 124 may be configured by a general-purpose communication device such as a mobile phone or a smartphone. The navigation apparatus may use the communication unit 124 to communicate directly with the specific device or indirectly via a predetermined server.

The controller 100 has a function of controlling operations of the map data storage 121, the display/input unit 122, the audio output unit 123, and the communication unit 124 so that these units can perform predetermined operations as part of the navigation apparatus.

As illustrated in FIG. 1, the controller 100 includes a map data acquiring unit 101, an own position calculator 102, an external information acquiring unit 103, a route calculator 104, a guidance information generator 105, a map display generator 106, a display data generator 107, an input analyzer 108, an audio output controller 109, a communication controller 110, an other person's position acquiring unit 111, an other person's moving direction acquiring unit 112, an internal data holding unit 116, and an overall controller 117. The controller 100 is configured as an incorporated system that includes a CPU and a memory, and the constituent elements of the controller 100 illustrated in FIG. 1 are functional blocks achieved by software.

The map data acquiring unit 101 has a function of acquiring map data from the map data storage 121.

The own position calculator 102 has a function of calculating the current position of the navigation apparatus from position information such as global positioning system (GPS) information and specifying the current position on a map through map matching using the map data acquired by the map data acquiring unit 101. The own position calculator 102 is also capable of calculating its own moving direction from the change of the current position. Note that in the case of a car navigation apparatus, not only the GPS information but also vehicle information such as a vehicle speed pulse and the turning angle (steering angle) of the steering wheel is also used by the own position calculator 102 as position information for calculating its own relative position.

The external information acquiring unit 103 has a function of acquiring information (external information) regarding the external environment of the navigation apparatus, such as weather information and traffic information. In the case of a car navigation apparatus, the external information acquiring unit 103 generally obtains information from a dedicated communication device such as a vehicle information and communications system (VICS) (registered trademark) receiver or a traffic message channel (TMC) receiver, but alternatively may acquire weather information and traffic information via the communication unit 124 if the communication unit 124 is a general-purpose communication device. The external information acquired by the external information acquiring unit 103 may include information (sensor information) detected with various types of sensors (e.g., a rainfall sensor, a temperature sensor, and an optical sensor) that are connected to the navigation apparatus. The term "connection" as used here refers not only to direct connection but also to a state in which information can be acquired via a network.

The route calculator 104 has a function of searching for a route between two points in the map data, and primarily calculates a route from the current position to the destination.

The guidance information generator 105 has a function of generating information (guidance information) for guiding a user along the route that is set by the route calculator 104. The guidance information includes information such as what guidance to provide at which point on the route. The route guidance is implemented by the display/input unit 122 and the audio output unit 123 outputting images and audio in accordance with the guidance information generated by the guidance information generator 105. In other words, the route calculator 104, the guidance information generator 105, the display/input unit 122, and the audio output unit 123 operate in cooperation with one another as a guidance unit that sets a route to the destination and guides a user to the destination.

The map display generator 106 has a function of generating map image data from the map data acquired by the map data acquiring unit 101.

The display data generator 107 has a function of generating display data for displaying an image on the display/input unit 122. The display data is obtained by combining the map image data generated by the map display generator 106 with the icons indicating the current position, the destination and other places, an image for route guidance, and software keys, for example.

The input analyzer 108 has a function of analyzing a user operation performed on the display/input unit 122 and recognizing the intention of the operation and the content of input information.

The audio output controller 109 has a function of generating an audio signal for causing the audio output unit 123 to output audio.

The communication controller 110 has a function of controlling the communication unit 124 to transmit and receive various types of data to and from the specific device.

The other person's position acquiring unit 111 has a function of acquiring the current position of the specific device via the communication unit 124. The other person's moving direction acquiring unit 112 has a function of acquiring or calculating a moving direction of the specific device via the communication unit 124.

In the following description, the current position and moving direction of the navigation apparatus are respectively referred to as an "own position" and an "own moving direction," and the current position and moving direction of the specific device are respectively referred to as an "other person's position" and an "other person's moving direction."

The internal data holding unit 116 has a function of holding data that is necessary for the operations of the constituent elements of the controller 100. The data stored in the internal data holding unit 116 includes, for example, the own position and own moving direction obtained by the own position calculator 102, the other person's position acquired by the other person's position acquiring unit 111, the other person's moving direction acquired or calculated by the other person's moving direction acquiring unit 112, the destination set by the route calculator 104, and the route obtained by the route calculator 104.

The operations of the constituent elements of the controller 100 are integrally controlled by the overall controller 117.

Figure 2:
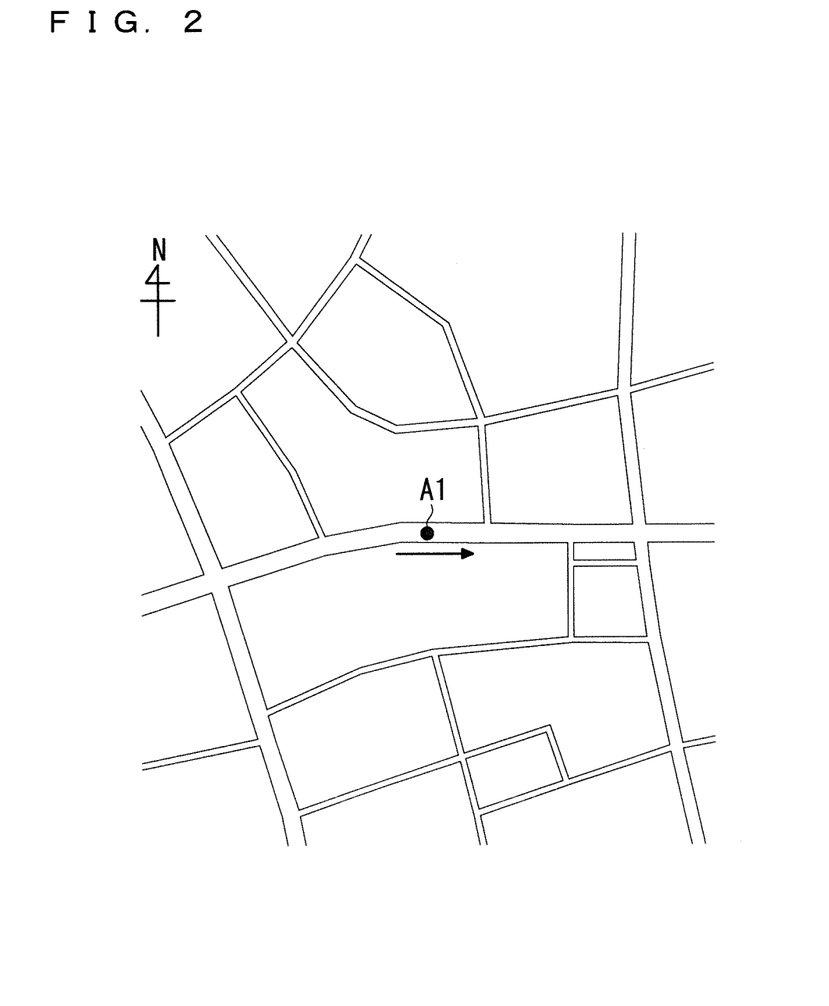
FIG. 2 shows an example of the position and moving direction of the navigation apparatus.

Now, a map displayed by a conventional navigation apparatus will be described. FIG. 2 shows an example of the position and moving direction of the navigation apparatus. Here, a state is assumed in which a vehicle provided with the navigation apparatus is at a point A1 in a road network illustrated in FIG. 2 and moving eastward (in the direction indicated by the arrow).

Figure 3:
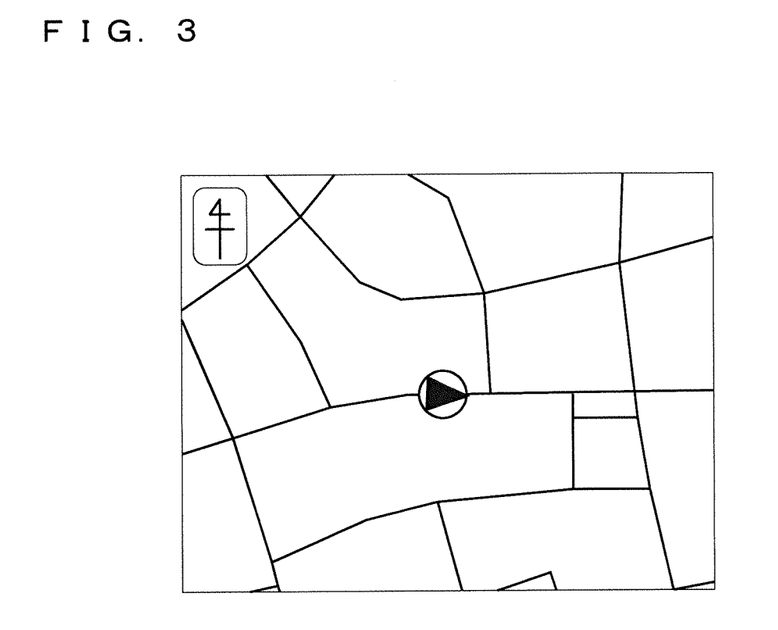
FIG. 3 illustrates a map displayed (north-up) by a conventional navigation apparatus.
Figure 4:
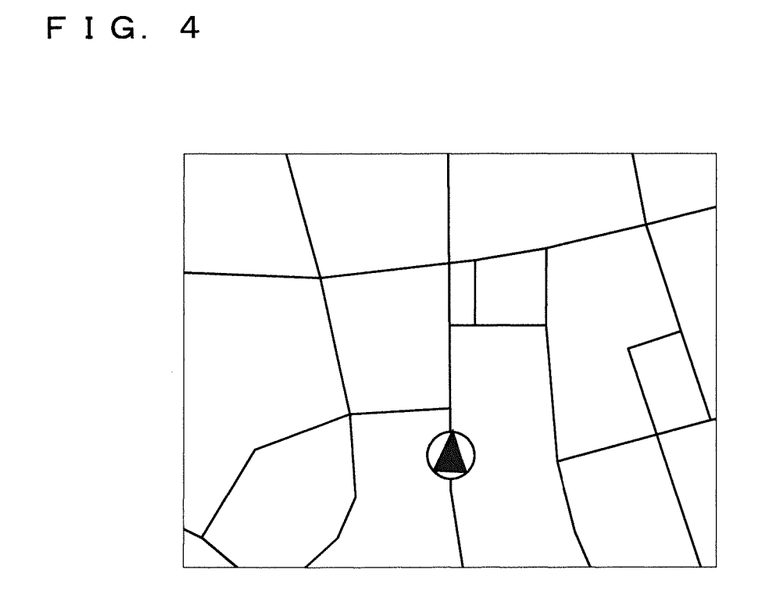
FIG. 4 illustrates a map displayed (heading-up) by a conventional navigation apparatus.

Examples of methods used by the conventional navigation apparatus to display a map include "north-up" display in which north is displayed at the top and "heading-up" display in which the own moving direction is displayed at the top. FIG. 3 illustrates a map in which the state in FIG. 2 is displayed north-up, and FIG. 4 illustrates a map in which the state in FIG. 2 is displayed heading-up. In FIGS. 3 and 4, the black triangle enclosed in a circle indicates the position (own position) and moving direction (own moving direction) of the navigation apparatus of the vehicle.

In the north-up map display in FIG. 3, the map is generally displayed such that the own position is located in the center of the screen. In the heading-up map display in FIG. 4, the map is displayed such that the own position is located below the center of the screen, so as to display a large map in the moving direction. Alternatively, the north-up map display may also employ a method for displaying the own position off center on the screen so as to display a large map in the moving direction.

The navigation apparatus according to Embodiment 1 uses a new method to display a map. This display method is based on the assumption that the navigation apparatus and the specific device each recognize the other as a communication partner and operate in cooperation with each other to enable information exchange. The specific device, which operates in cooperation with the navigation apparatus, has a function of acquiring its current position from the GPS system or the like and is capable of transmitting its own position information to the navigation apparatus. A navigation apparatus is a typical example of an information device having a function of acquiring its current position, but the specific device does not necessarily have to have a navigation function.

Figure 5:
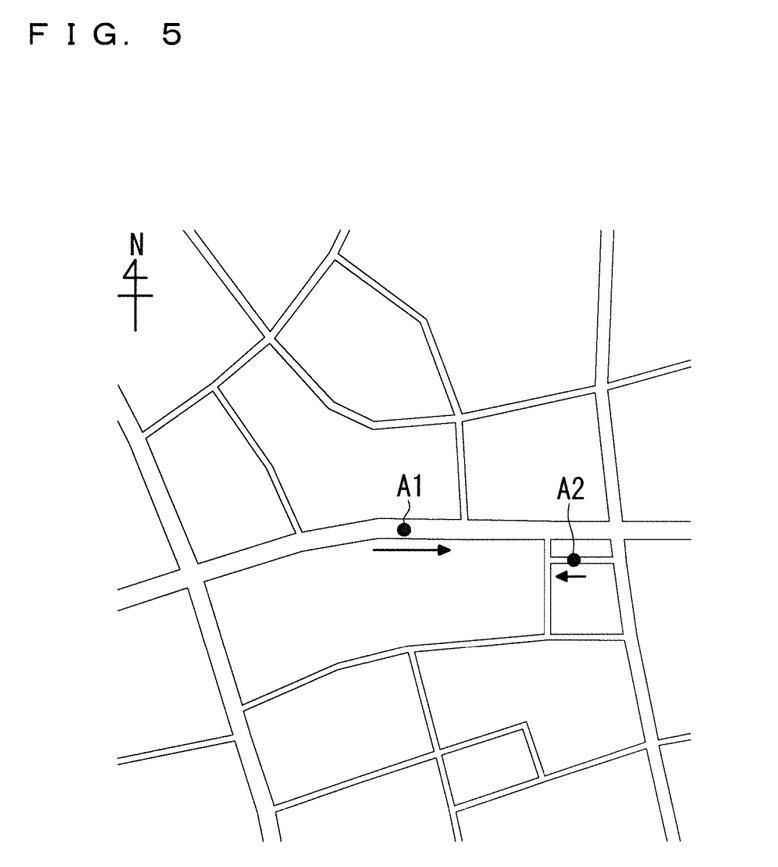
FIG. 5 shows an example of the positions and moving directions of the navigation apparatus and a specific information device.

FIG. 5 shows an example of the positions and moving directions of the navigation apparatus according to Embodiment 1 and the specific device operating in cooperation with the navigation apparatus. Here, a state is assumed in which a vehicle provided with the navigation apparatus is at a point A1 and moving eastward, whereas a user of a mobile terminal serving as the specific device is at a point A2 and walking westward.

Figure 6:
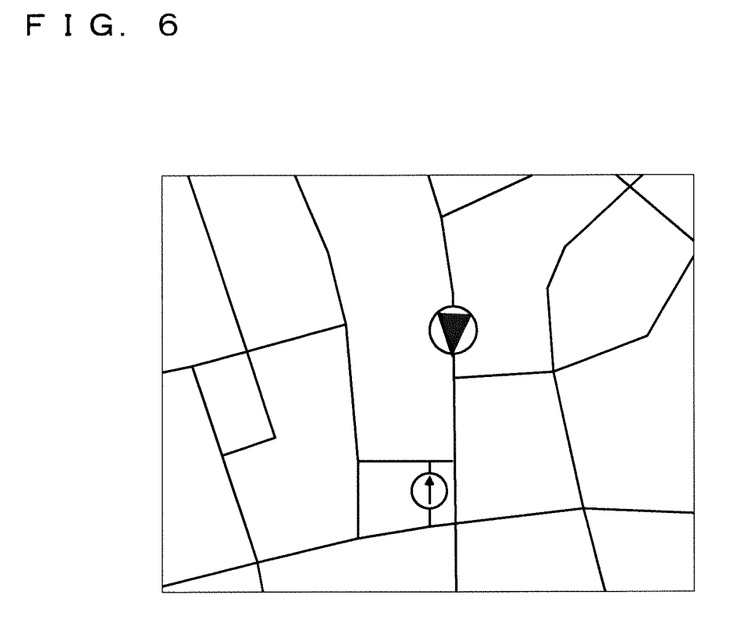
FIG. 6 illustrates a map displayed (other person's heading-up) by the navigation apparatus according to Embodiment 1.

FIG. 6 illustrates a map displayed by the navigation apparatus according to Embodiment 1. In FIG. 6, the black triangle enclosed in a circle indicates the position (own position) and moving direction (own moving direction) of the navigation apparatus, and the arrow enclosed in a circle indicates the position (other person's position) and moving direction (other person's moving direction) of the specific device.

The navigation apparatus according to Embodiment 1 displays the map on its own screen (display/input unit 122), using the other person's position and other person's moving direction acquired by the other person's position acquiring unit 111 and the other person's moving direction acquiring unit 112. In other words, the map is displayed on the screen of the navigation apparatus as illustrated in FIG. 6, with the moving direction of the specific device oriented up.

This display method is hereinafter referred to as "other person's heading-up" display. In the other person's heading-up map display, the display position of the other person's position on the map is set to a position below the center of the screen (to the display position of the own position on the conventional heading-up map). In other words, the other person's heading-up map is equivalent to displaying a heading-up map based on the specific device on the screen of the navigation apparatus operating in cooperation with the specific device.

Note that the navigation apparatus according to Embodiment 1 normally displays a map based on the own moving direction or a specific bearing in a conventional way (which is hereinafter referred to as "map display based on the own device"), but it is also configured to be able to switch to the other person's heading-up map display as necessary.

Figure 7:
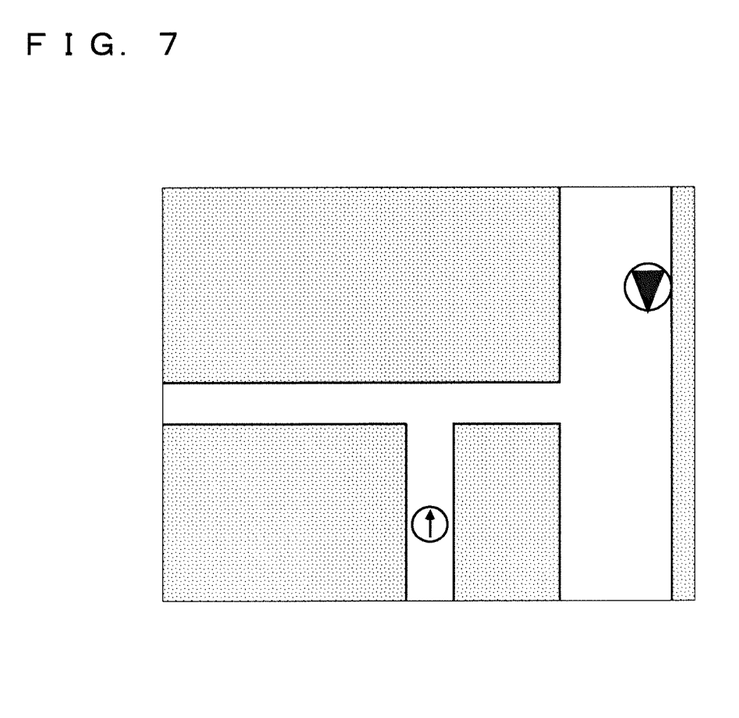
FIG. 7 illustrates a map displayed by the navigation apparatus according to Embodiment 1.

For example, it is assumed that the vehicle provided with the navigation apparatus has moved from the state illustrated in FIGS. 5 and 6 and arrived in the vicinity of the user of the specific device and stopped, in order to meet the user of the specific device. At this time, the other person's heading-up map is displayed by the navigation apparatus of the vehicle, and will be as illustrated in FIG. 7 when the scale of the map is increased. When the driver of the vehicle gives the user of the specific device directions to the own position with a mobile phone or the like, the driver, by looking at the map of FIG. 7, is able to intuitively explain his or her own position from the perspective of the user of the specific device in terms such as "Turn right at the next corner and you'll come onto a wide street. My car is on the other side of that street, on the left side." This makes it possible to facilitate the process of meeting up.

The other person's heading-up map that is displayed may have an arbitrary scale. For example, in the case where the north-up or heading-up map display is switched to the other person's heading-up map display, the scale of the map may be maintained. In the case where the specific device is another navigation apparatus, the other navigation apparatus may acquire the scale of the map currently displayed through communication and use the same scale to display the other person's heading-up map.

Figure 8:
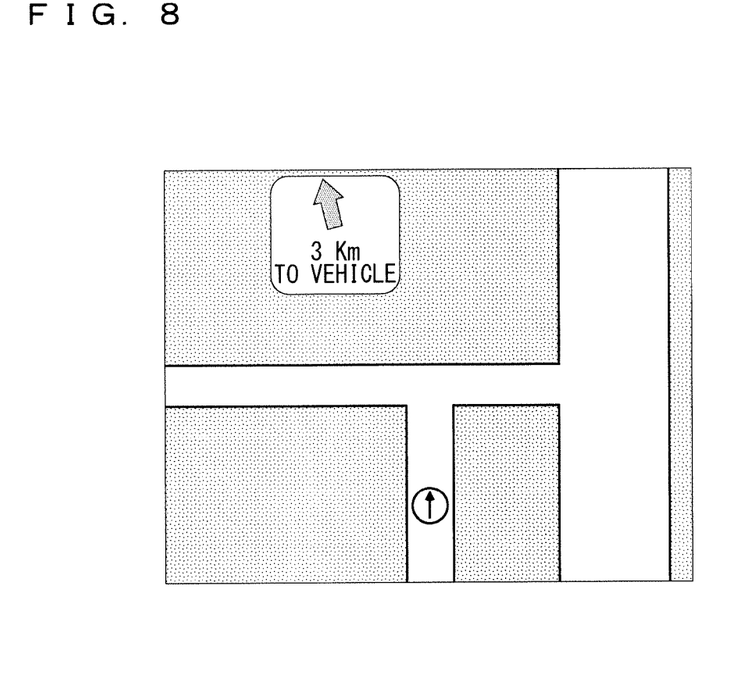
FIG. 8 illustrates a map displayed by the navigation apparatus according to Embodiment 1.
Figure 9:
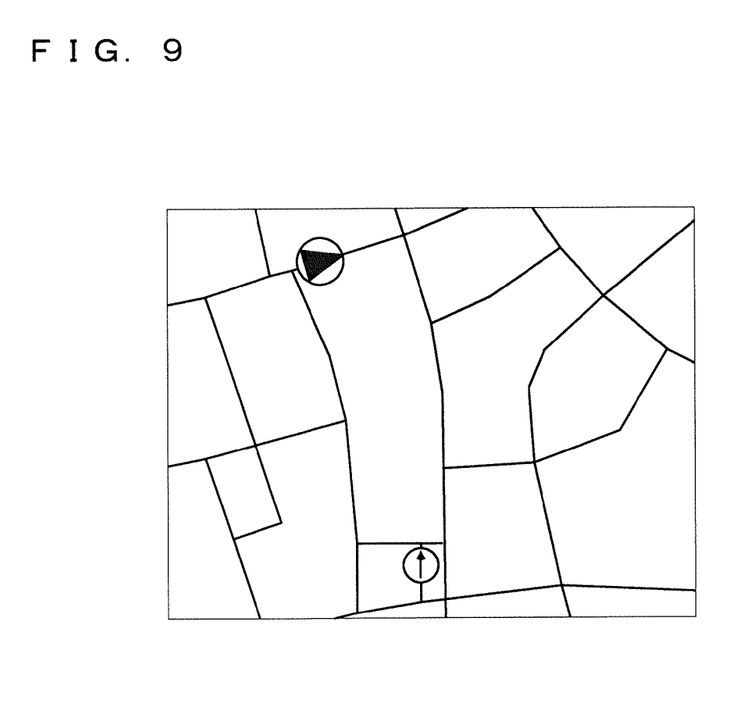
FIG. 9 illustrates a map displayed by the navigation apparatus according to Embodiment 1.

Depending on the scale of the other person's heading-up map that is displayed, a case is conceivable in which the own position is outside the screen and not displayed. In this case, as illustrated in FIG. 8, an icon or message that indicates the distance and direction of the own position from the other person's position may be displayed on the screen so that the user is able to grasp the positional relationship between the other person's position and the own position. Alternatively, the navigation apparatus may have a function of automatically adjusting the scale of the map so that the other person's position and the own position are both displayed on the screen as illustrated in FIG. 9.

Figure 10:
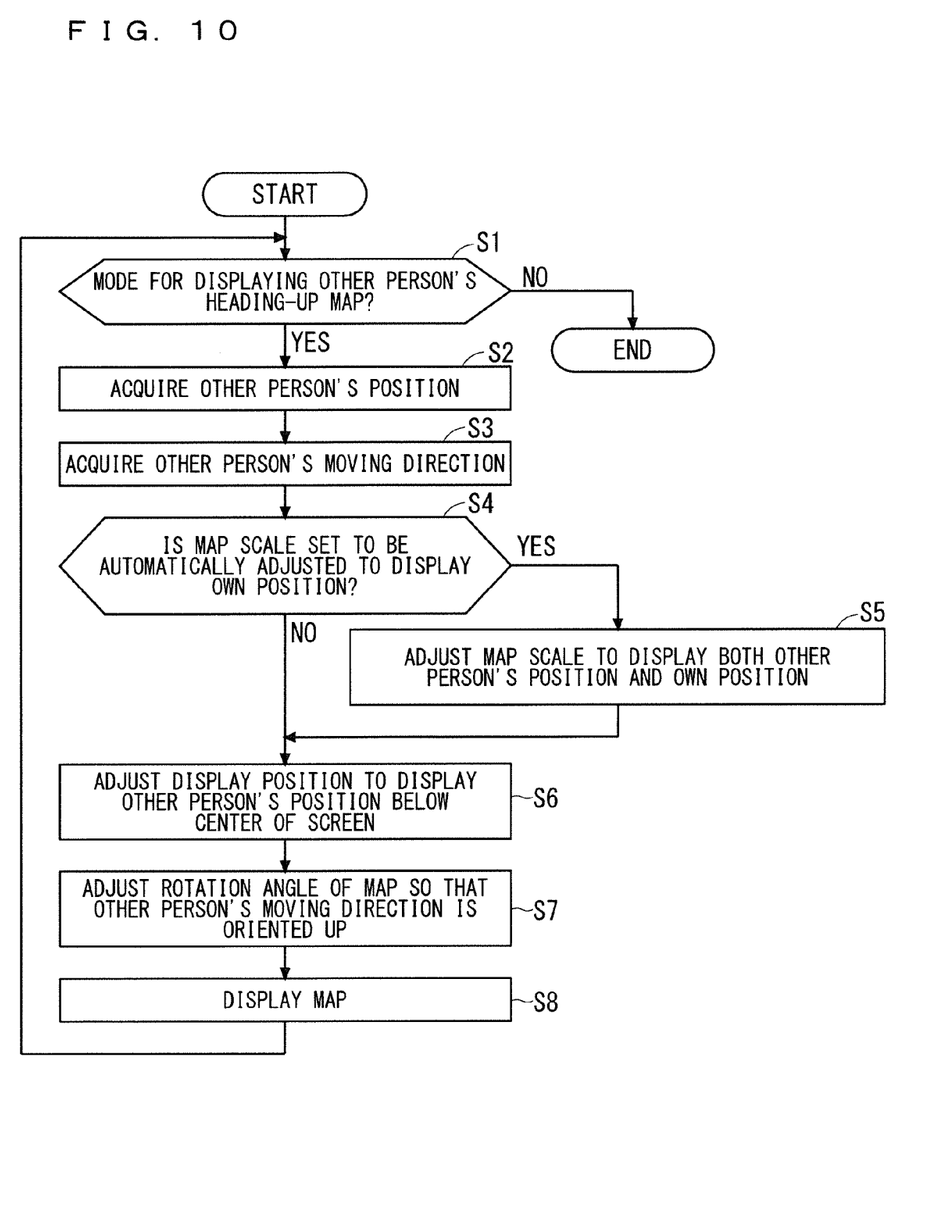
FIG. 10 is a flowchart of operations performed by the navigation apparatus according to Embodiment 1.

FIG. 10 is a flowchart of operations performed by the navigation apparatus according to Embodiment 1 to display the other person's heading-up map.

First, the navigation apparatus determines whether or not the map display mode is set to a mode for displaying the other person's heading-up map (other person's heading-up mode) (step S1). The display mode may be arbitrarily set by a user. However, in the case where the navigation apparatus is mounted on a vehicle, it is desirable to be able to switch to the other person's heading-up mode only when the vehicle is in park. This is because displaying the other person's heading-up map during driving may hinder the driver from grasping the own position and obstruct the original purpose, i.e., driving support, of the navigation apparatus.

If the navigation apparatus is not in the other person's heading-up mode (NO in step S1), the processing for displaying the other person's heading-up map ends. In this case, the navigation apparatus displays the map based on the own device (north-up or heading-up).

If the navigation apparatus is in the other person's heading-up mode (YES in step S1), the navigation apparatus causes the other person's position acquiring unit 111 and the other person's moving direction acquiring unit 112 to acquire the position (other person's position) and moving direction (other person's moving direction) of the specific device (steps S2 and S3).

Next, the navigation apparatus determines the scale of the other person's heading-up map to be displayed. Here, it is assumed that the user is able to set whether or not to automatically adjust the scale of the map in order to display not only the other person's position but also the own position.

If the scale of the map is set to be automatically adjusted (YES in step S4), the navigation apparatus adjusts the scale of the map on the basis of the positional relationship (distance and direction) between the other person's position and the own position so that both of the other person's position and the own position can be displayed within the screen (step S5). If the scale of the map is set to not be automatically adjusted (NO in step S4), the same scale as that of the map previously displayed is used.

The navigation apparatus then adjusts the display position of the other person's position so that the other person's position is located below the center of the screen (step S6), adjusts the rotation angle of the map so that the other person's moving direction is oriented up (step S7), and displays the resultant map on the screen of the display/input unit 122 (step S8).

Thereafter, the navigation apparatus repeatedly performs the operations of steps S1 to S8 while in the other person's heading-up mode.

While the above description discusses a configuration in which the specific device calculates its own moving direction (other person's moving direction) and the other person's moving direction acquiring unit 112 of the navigation apparatus acquires the other person's moving direction calculated by the specific device, a case is also conceivable in which the specific device is a device (e.g., a mobile phone) that does not have means for calculating its own moving direction. In this case, the other person's moving direction acquiring unit 112 is capable of estimating the moving direction of the specific device from a history of the other person's position acquired by the other person's position acquiring unit 111, i.e., the path of movement of the specific device.

Figure 11:
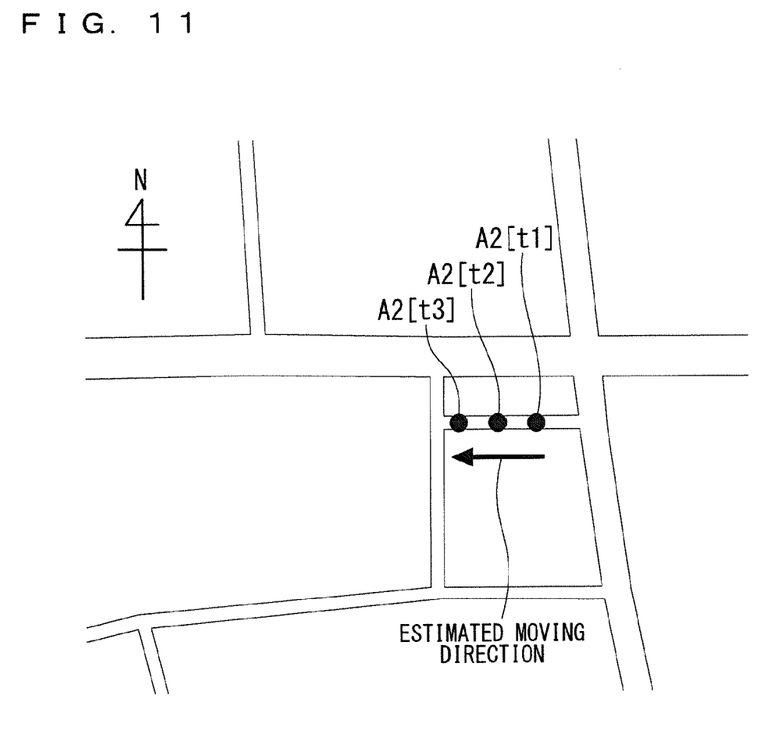
FIG. 11 is a diagram for explaining a method of estimating the moving direction of the specific information device.

FIG. 11 is a diagram for explaining a method for estimating the moving direction of the specific device. For example, if a point A2 [t1] where the specific device is located at time t1, a point A2[t2] where the specific device is located at time t2, which is immediately after time t1, and a point A2[t3] where the specific device is located at time t3, which is immediately after time t2, are aligned in order in a westward direction as illustrated in FIG. 11, the moving direction of the specific device can be estimated to be westward.

Figure 12:
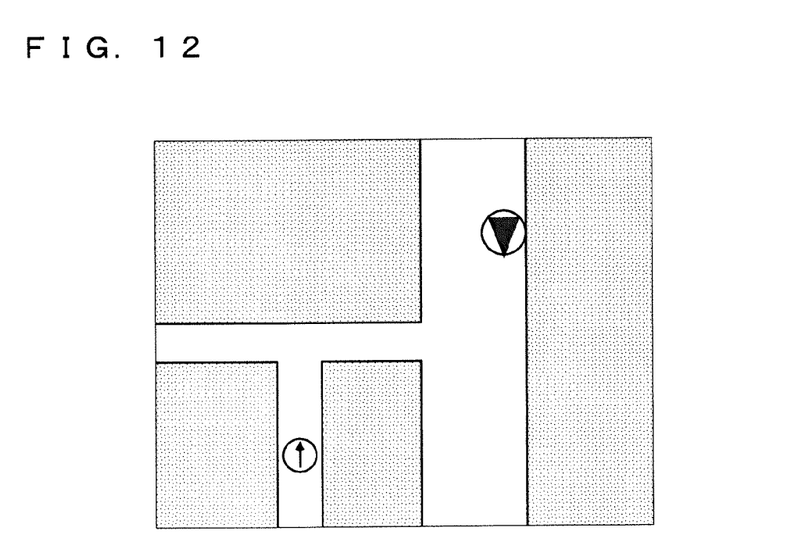
FIG. 12 illustrates a variation of the map displayed by the navigation apparatus according to Embodiment 1.

While in Embodiment 1, the other person's position is below the center of the screen in the display of the other person's heading-up map, if both of the own position and the other person's position are set to be displayed on the screen, the halfway point between the own position and the other person's position may be displayed in the center of the screen as illustrated in FIG. 12. The positional relationship between the own position and the other person's position in FIG. 12 is the same as that in FIG. 7, but in FIG. 12, the halfway point between the own position and the other person's position is displayed in the center of the screen. Display of the entire map is thus shifted to the left as compared with that of the map in FIG. 7.

Note that the navigation apparatus according to the present invention may be an in-vehicle navigation apparatus, or may be a portable navigation apparatus (including a mobile terminal such as a mobile phone or a smartphone that has a navigation function).

It is sufficient for the specific device to be a device that has at least a function of acquiring the current position and a communication function. A navigation apparatus is a typical example of information device having a function of acquiring the current position. The specific device may also be an in-vehicle navigation apparatus or a portable navigation apparatus, but does not necessarily have to have a navigation function.

Map data that is used to display the other person's heading-up map may be different from own map data used for route guidance. For example, in the case where an in-vehicle navigation apparatus according to the present invention displays the other person's heading-up map in cooperation with a portable navigation apparatus of a person on foot, map data for pedestrians rather than map data for vehicles is used to display the map. Normally, the map data for vehicles and the map data for pedestrians are different (the map data for pedestrians also includes data regarding pedestrian roads and underground malls). Thus, using map data adapted to the environment of the specific device to display the other person's heading-up map enables display that is closer to the perspective of the user of the specific device.

The map data used to display the other person's heading-up map may be stored in advance in the navigation apparatus according to the present invention, or may be acquired from the specific device or a predetermined server through communication. The map data used to display the other person's heading-up map may be map data that is more simplified or characteristic (exaggerated) than the map used for map display based on the own device. Displaying a landmark such as a building of distinctive shape in an emphasized manner allows the user of the navigation apparatus according to the present invention to more easily give the user of the specific device directions to his or her own position.

Embodiment 2

Some existing navigation apparatuses are capable of displaying a plurality of sub-screens on a single screen of the display unit. In Embodiment 2, the present invention is applied to a navigation apparatus that is capable of displaying sub-screens.

Figure 13:
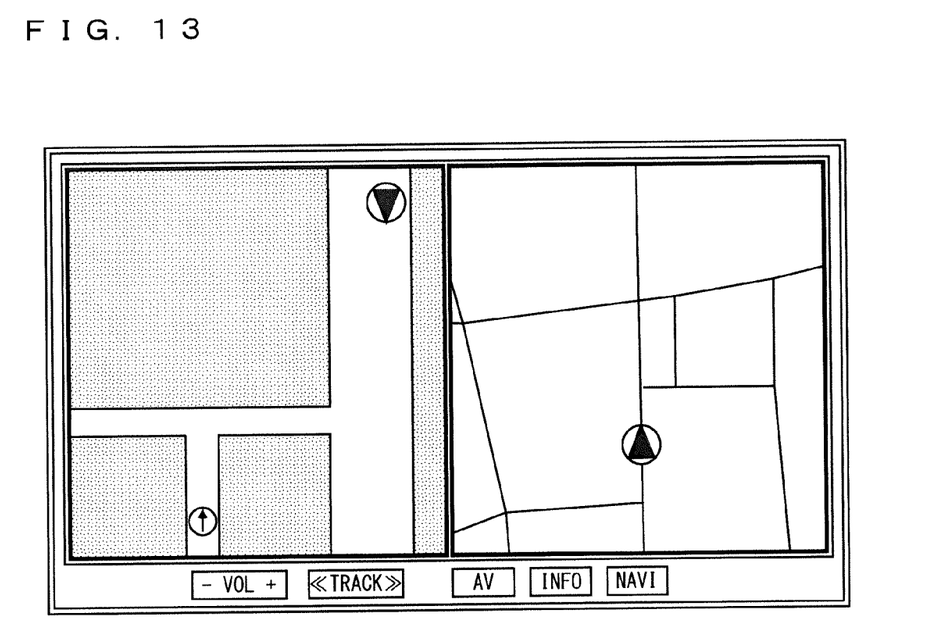
FIG. 13 illustrates a screen layout of a navigation apparatus according to Embodiment 2.

FIG. 13 illustrates a screen layout of the navigation apparatus according to Embodiment 2. The navigation apparatus has a function of dividing the screen into right and left halves and displaying two sub-screens next to each other. In the present embodiment, one of the sub-screens (on the right side) displays a (north-up or heading-up) map using the display method based on the own device, and the other sub-screen (on the left side) displays an other person's heading-up map as illustrated in FIG. 13.

The navigation apparatus according to Embodiment 2 is capable of displaying the map based on the own device and the other person's heading-up map at the same time. Thus, for example, even if an in-vehicle navigation apparatus displays the other person's heading-up map on one of the sub-screens while the vehicle is moving, the driver is able to easily grasp the own position from the map displayed on the other sub-screen. In other words, the other person's heading-up map can be displayed without obstructing the driving support function of the in-vehicle navigation apparatus.

Figure 14:
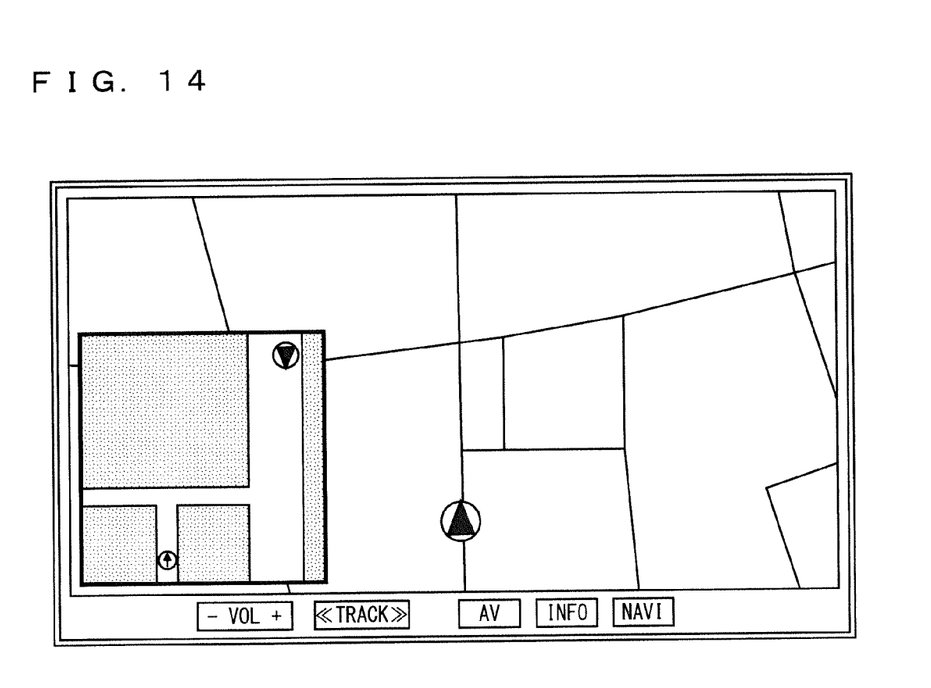
FIG. 14 illustrates a screen layout of the navigation apparatus according to Embodiment 2.

While FIG. 13 shows an example of displaying two sub-screens next to each other on the screen of the navigation apparatus, it is also possible to superimpose a sub-screen on a main screen and display these screens as illustrated in FIG. 14, for example. In the example of FIG. 14, the main screen displays the (north-up or heading-up) map using the display method based on the own device, and the sub-screen superimposed on the main screen displays the other person's heading-up map. In this case as well, it is possible to achieve the same effect as that in FIG. 13 since the map based on the own device and the other person's heading-up map can be displayed at the same time.

Figure 15:
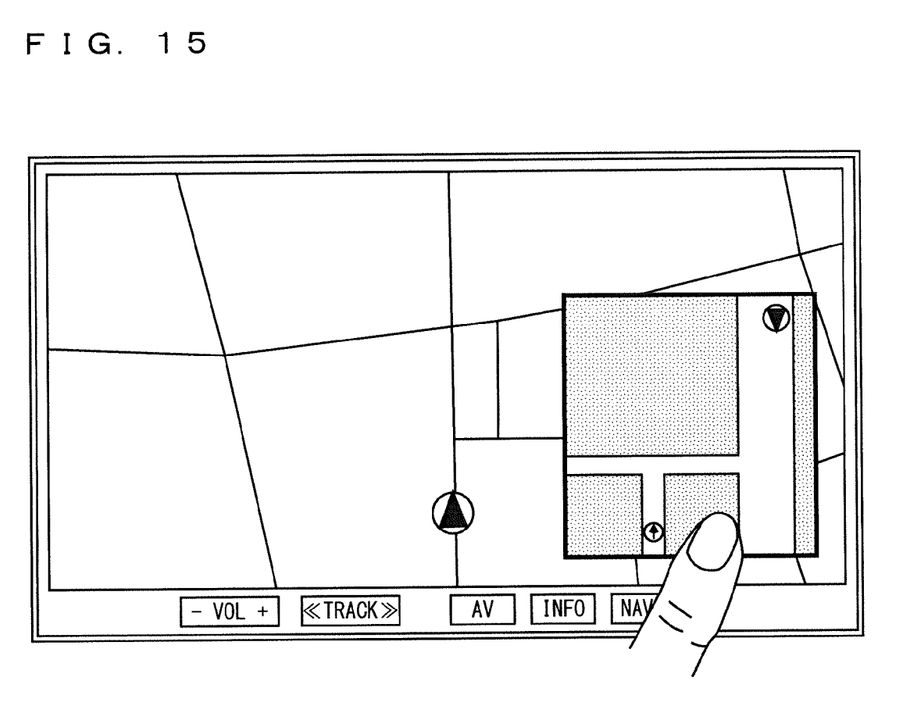
FIG. 15 illustrates a screen layout of the navigation apparatus according to Embodiment 2.

In the display mode in FIG. 14, if the screen has a function as a touch panel, the sub-screen may be configured to be slidable by the user touching the screen as illustrated in FIG. 15. This prevents the position that the user wants to see on the map from being hidden under the sub-screen. Conversely to FIGS. 14 and 15, the main screen may display the other person's heading-up map and the sub-screen may display the map using the display method based on the own device.

While FIGS. 13 to 15 show diagrams that assume the screen of the in-vehicle navigation apparatus, the present embodiment is also applicable to a portable navigation apparatus.

Figure 16:
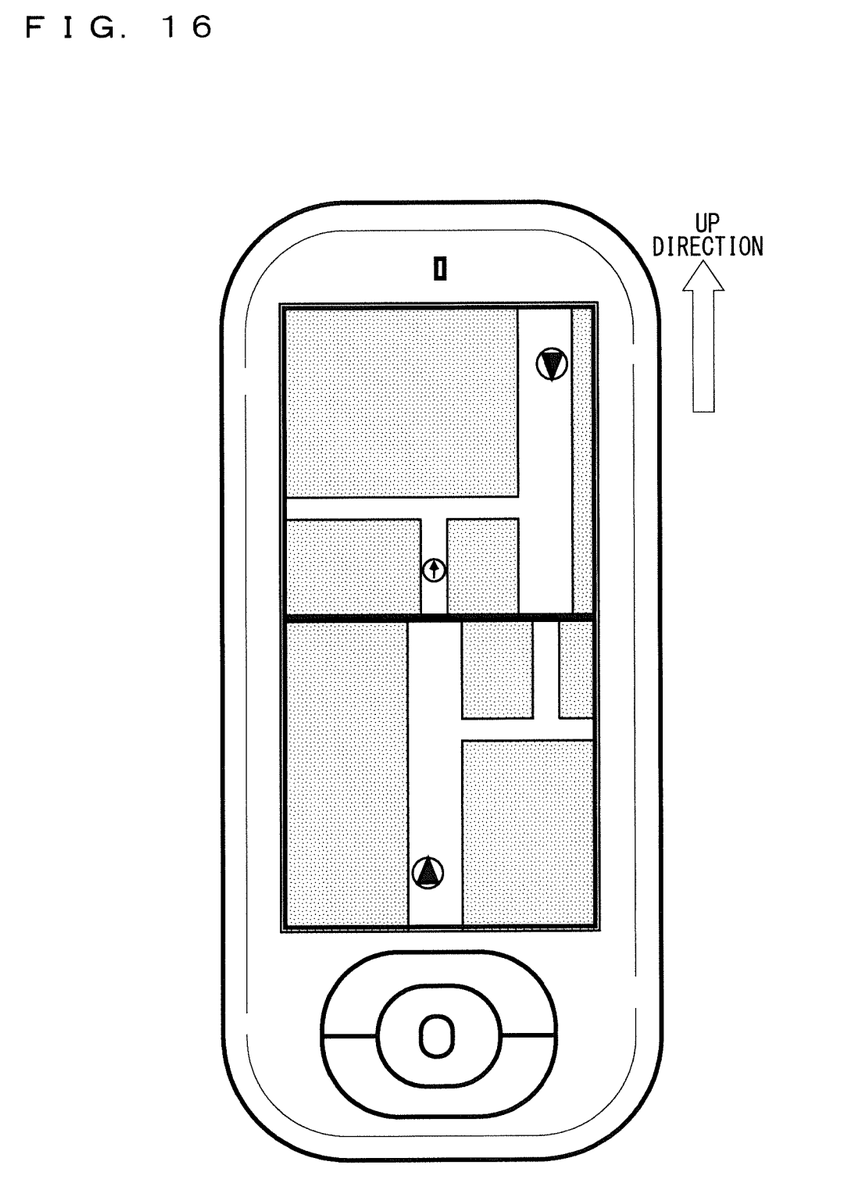
FIG. 16 illustrates a screen layout of the navigation apparatus according to Embodiment 2.

FIG. 16 illustrates a screen layout of the portable navigation apparatus according to Embodiment 2. The navigation apparatus has a function of displaying two sub-screens next to each other on a single screen. In FIG. 16, the upper sub-screen displays an other person's heading-up map, and the lower sub-screen displays a (north-up or heading-up) map using the display method based on the own device.

One typical function of a mobile terminal is screen autorotation. A mobile terminal using this function maintains the up-down direction of the screen in the actual vertical direction (the direction of gravity) by rotating the screen 90 degrees when the main body is stood up vertically or laid over horizontally. The present embodiment is also applicable to a portable navigation apparatus having a screen autorotation function.

Figure 17:
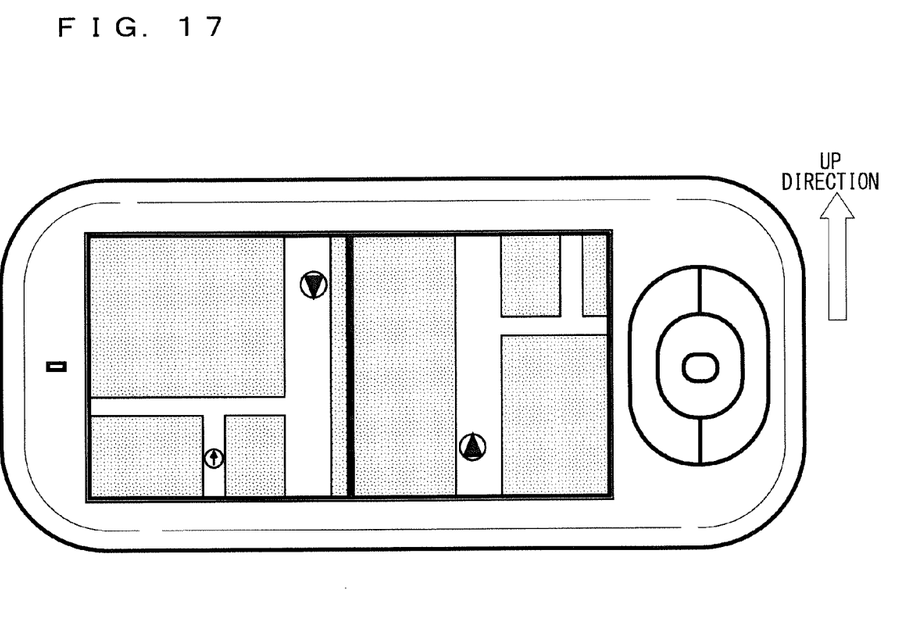
FIG. 17 illustrates a screen layout of the navigation apparatus according to Embodiment 2.

For example, if the portable navigation apparatus with a screen autorotation function in FIG. 16 is laid over horizontally, the maps displayed on the two sub-screens are each rotated 90 degrees as illustrated in FIG. 17. Specifically, the other person's heading-up map is displayed on the left-side sub-screen, and the map using the display method based on the own device is displayed on the right-side sub-screen. Rotating the maps so that the up-down direction of each map is maintained in the direction of gravity in this way allows the user to always intuitively recognize the positional relationship between his or her own position and the other person's position, regardless of how the navigation apparatus is held by the user.

Figure 18:
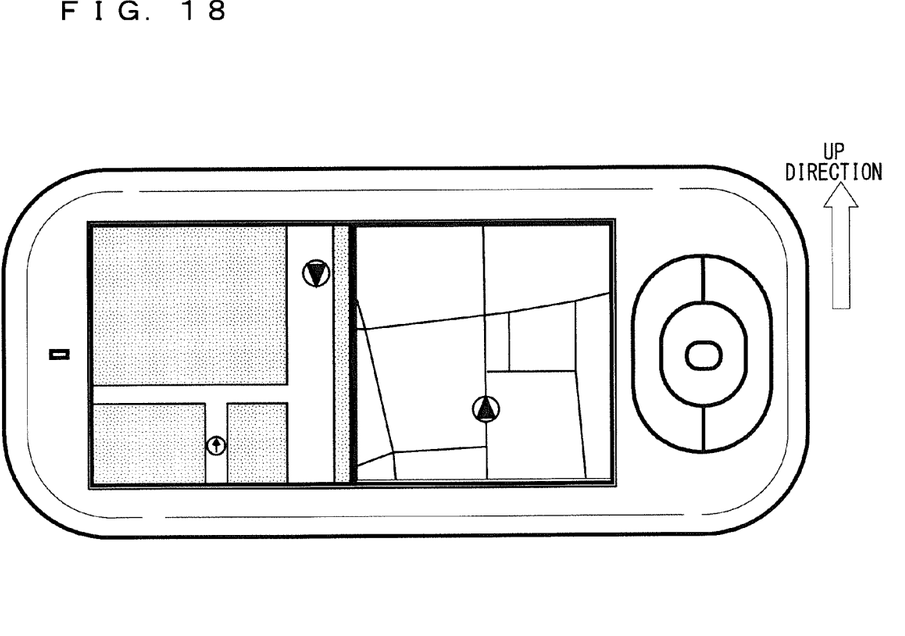
FIG. 18 illustrates a screen layout of the navigation apparatus according to Embodiment 2.

Some portable navigation apparatuses have a navigation function for vehicles, in addition to a navigation function for pedestrians. The present embodiment is also applicable to such portable navigation apparatuses. FIG. 18 shows an example of such a screen display. In FIG. 18, the left-side sub-screen displays an other person's heading-up map, and the right-side sub-screen displays a map using the display method based on the own device. At this time, if the user of the specific device is a person on foot, it is preferable for the navigation apparatus to display the other person's heading-up map by using map data for use in the navigation function for pedestrians and to display the map using the display method based on the own device by using map data for use in the navigation function for vehicles.

While Embodiments 1 and 2 show examples in which the in-vehicle navigation apparatus acquires the position information and moving direction of the mobile terminal of a person (on foot) whom the driver is meeting and displays an other person's heading-up map (a map in which the moving direction of the mobile terminal is oriented up), a configuration is also possible in which if the person on foot has a mobile phone that has a function of displaying a map, the mobile terminal acquires the position information and moving direction of the in-vehicle navigation apparatus and displays the other person's heading-up map (a map in which the moving direction of the vehicle is oriented up). In other words, the in-vehicle navigation apparatus may operate as the specific device. Displaying the other person's heading-up map on the mobile terminal of a person whom the driver is meeting allows the person to intuitively grasp his or her own position from the perspective of the vehicle (the own position relative to the vehicle's position). Thus, if the person wishes the vehicle to pick him or her up at his or her own position, the person is able to contact the driver of the vehicle by a mobile phone or the like and explain his or her own position in an easy-to-comprehend way to the driver. The map displayed on the mobile terminal of the person at this time may be a map for vehicles. In this case, it is possible to achieve the effect of enabling the person to more easily explain his or her own position from the perspective of the vehicle. Alternatively, two screens may be displayed as in Embodiment 2, even in the case where the other person's heading-up map is displayed on the mobile terminal of a person whom the driver is meeting.

While Embodiments 1 and 2 show examples in which the other person's heading-up map is displayed as a result of the navigation apparatus for vehicles and the navigation apparatus for pedestrians cooperating with each other (e.g., a mobile terminal or a portable navigation device (PND)), the two navigation apparatuses that cooperate with each other may both be navigation apparatuses for vehicles or may both be navigation apparatuses for pedestrians. The application of the present invention is not limited to navigation apparatuses for pedestrians or automobiles, and the present invention is widely applicable to navigation apparatuses that are mounted on various types of mobile bodies such as motorboats, bicycles, and motorbikes.

It should be noted that the present invention can be implemented by freely combining the above embodiments or by making modifications or omissions to the embodiments as appropriate without departing from the scope of the present invention.

While the invention has been shown and described in detail, the foregoing description is in all aspects illustrative and not restrictive. It is therefore to be understood that numerous modifications and variations can be devised without departing from the scope of the invention.

REFERENCE SIGNS LIST

100 Controller
101 Map data acquiring unit
102 Own position calculator
103 External information acquiring unit
104 Route calculator
105 Guidance information generator
106 Map display generator
107 Display data generator
108 Input analyzer
109 Audio output controller
110 Communication controller
111 Other person's position acquiring unit
112 Other person's moving direction acquiring unit
116 Internal data holding unit
117 Overall controller
121 Map data storage
122 Display/input unit
123 Audio output unit
124 Communication unit

The invention claimed is:

1. A navigation apparatus comprising:
a processor (CPU) that executes a program; and
a memory that stores the program, the program when executed by the processor performing a process of
exchanging data with a communication unit that communicates with a specific information device;
acquiring an own position;
acquiring a position of said specific information device via said communication unit;
acquiring a moving direction of said specific information device; and
outputting display data to a display configured to display a map,
wherein said display is configured to display a map in which the moving direction of said specific information device is oriented up, and
in a state where the navigation apparatus is mounted in a vehicle, the map in which the moving direction of said specific information device is oriented up is allowed to be displayed only while the vehicle is stopped.

2. The navigation apparatus according to claim 1, wherein said display is configured to display a plurality of sub-screens simultaneously,
a first sub-screen displays a map with the moving direction of said specific information device oriented up, and
a second sub-screen displays a map with an own moving direction or a specific bearing oriented up.

3. The navigation apparatus according to claim 1, wherein said display is configured to display a sub-screen superimposed on a main screen,
one of said main screen and said sub-screen displays a map with the moving direction of said specific information device oriented up, and
the other of said main screen and said sub-screen displays a map with an own moving direction or a specific bearing oriented up.

4. The navigation apparatus according to claim 1, wherein the distance and direction from the position of said specific information device to the own position is displayed with the map in which the moving direction of said specific information device is oriented up.

5. The navigation apparatus according to claim 1, wherein the acquired moving direction of said specific information device is calculated by said specific information device.

6. The navigation apparatus according to claim 1, wherein the navigation apparatus is a portable navigation apparatus, and
the map displayed on said display rotates depending on an orientation of the navigation apparatus.

7. The navigation apparatus according to claim 1, wherein the map in which the moving direction of said specific information device is oriented up is displayed using map data that is different from own map data used for route guidance.

8. The navigation apparatus according to claim 7, wherein said map data different from said own map data used for route guidance is obtained through communication.

9. The navigation apparatus according to claim 8, wherein said map data different from said own map data used for route guidance is more simplified or exaggerated than said own map data used for route guidance.

10. A navigation apparatus comprising:
a processor (CPU) that executes a program; and
a memory that stores the program, the program when executed by the processor performing a process of
exchanging data with a communication unit that communicates with a specific information device;
acquiring an own position;
acquiring a position of said specific information device via said communication unit;
obtaining a moving direction of said specific information device; and
outputting display data to a display configured to display a map,
wherein said display is configured to display a first map in which an own moving direction or a specific bearing is oriented up and a second map in which the moving direction of said specific information device is oriented up at the same time, and
the second map, in which the moving direction of said specific information device is oriented up, is displayed only while the first map, in which the own moving direction or the specific bearing is oriented up, is displayed.

11. The navigation apparatus according to claim 10, wherein
said display is configured to display a plurality of sub-screens simultaneously,
a first sub-screen displays the second map with the moving direction of said specific information device oriented up, and
a second sub-screen displays the second map with an own moving direction or a specific bearing oriented up.

12. The navigation apparatus according to claim 10, wherein
  said display is configured to display a sub-screen superimposed on a main screen,
  one of said main screen and said sub-screen displays the second map with the moving direction of said specific information device oriented up, and
  the other of said main screen and said sub-screen displays the first map with an own moving direction or a specific bearing oriented up.

13. The navigation apparatus according to claim 10, wherein the distance and direction from the position of said specific information device to the own position is displayed with the second map in which the moving direction of said specific information device is oriented up.

14. The navigation apparatus according to claim 10, wherein the acquired moving direction of said specific information device is calculated by said specific information device.

15. The navigation apparatus according to claim 10, wherein
  the navigation apparatus is a portable navigation apparatus, and
  a map displayed on said display rotates depending on an orientation of the navigation apparatus.

16. The navigation apparatus according to claim 10, wherein the second map in which the moving direction of said specific information device is oriented up is displayed using map data that is different from own map data used for route guidance.

17. The navigation apparatus according to claim 16, wherein said map data different from said own map data used for route guidance is obtained through communication.

18. The navigation apparatus according to claim 17, wherein said map data different from said own map data used for route guidance is more simplified or exaggerated than said own map data used for route guidance.

* * * * *